United States Patent [19]

Iwai et al.

[11] 3,777,618
[45] Dec. 11, 1973

[54] ACTUATOR ASSEMBLY FOR USE WITH INDUSTRIAL ROBOTS

[75] Inventors: Shigeru Iwai, Chiba-shi; Yoshiaki Kitamura, Higashi-Katsushika-gun, both of Japan

[73] Assignee: Kabushiki Kaisha Daini Seikosha

[22] Filed: Dec. 27, 1971

[21] Appl. No.: 212,344

[30] Foreign Application Priority Data
Dec. 26, 1970 Japan.............................. 45/118893

[52] U.S. Cl............................. 91/61, 91/411, 92/2, 92/13.3, 92/13.4, 92/13.5
[51] Int. Cl.... F01b 21/00, F15b 11/16, F15b 15/24
[58] Field of Search....................... 92/2, 13.3, 13.4, 92/13.41, 13.5, 61; 91/61, 411

[56] References Cited
UNITED STATES PATENTS

| | | | |
|---|---|---|---|
| 2,436,424 | 2/1948 | Eastman | 92/2 X |
| 3,171,332 | 3/1965 | Randle | 92/13.5 |
| 3,260,376 | 7/1966 | Stoll | 91/61 X |
| 3,269,737 | 8/1966 | Freese | 92/121 X |
| 3,372,544 | 3/1968 | Kirkwood | 91/459 X |

FOREIGN PATENTS OR APPLICATIONS

| | | | |
|---|---|---|---|
| 665,568 | 6/1963 | Canada | 92/2 |

Primary Examiner—Irwin C. Cohen
Attorney—Robert E. Burns et al.

[57] ABSTRACT

An actuator assembly for actuating an arm of an industrial robot comprises a reciprocatory motor for effecting vertical reciprocal movement of the robot arm, an oscillatory motor for effecting angular oscillatory movement of the robot arm, and another reciprocatory motor for effecting horizontal reciprocal movement of the robot arm. The reciprocal motors and the oscillatory motor are fluid-actuated and a fluid circuit is provided for effecting actuation of each of the fluid motors independently of the operation of the others to effect three-dimensional movement of the robot arm with a high degree of precision and accuracy.

7 Claims, 4 Drawing Figures

ACTUATOR ASSEMBLY FOR USE WITH INDUSTRIAL ROBOTS

The present invention pertains to an actuator assembly for use in automatic machinery and more particularly, to an actuator assembly for effecting three-dimensional movement with a high degree of positional accuracy and which is suitable for use in actuating the arms of industrial robots.

Industrial robots are currently being used in many fields to perform a variety of different operations. In particular, the precision machinery industry has found many uses for industrial robots, including the positioning and transfer of workpieces into different work stations. The use of industrial robots in place of human personnel has proven to be very beneficial and a completely automated processing operation may be carried out thereby reducing costs and eliminating human error.

The industrial robots currently being used to employ transfer arms having a manipulator device connected to one end of the arm and an actuator assembly for actuating the transfer arm. The currently available actuator assemblies are generally electrically or hydraulically powered and are disadvantageous in that they provide only a very limited degree and variety of movement and are costly to manufacture.

The electrically powered actuator assemblies have a short useful lifespan due primarily to the heavy loading to which the actuator assembly is subjected. In addition, the electrically powered actuator assemblies cannot effect rapid movement of the transfer arm because of the inherent time lags present in the electric drive motors and associated circuitry and because of the large weight and inertia of the moving parts.

The hydraulically powered actuator assemblies are effective to actuate heavy loads but unfortunately, such assemblies are not applicable for use in the precision machinery industry because of their large size, slow actuating speed and low degree of positional accuracy. Moreover, the hydraulically powered actuator assemblies occupy a relatively large space and have numerous mechanical connections and, therefore are not well suited for use in compact or portable robots.

It is therefore a primary object of the present invention to provide an actuator assembly capable of performing diverse movements with a high degree of positional accuracy.

It is another object of the present invention to provide an actuator assembly for effecting vertical, horizontal and angular movement by means of several fluid-actuated motors, which are mechanically coupled together in a compact and portable arrangement.

Still another object of the invention is to provide an actuator assembly which is electrically controlled in accordance with information contained on a programmed record medium.

It is a further object of the present invention to provide an actuator assembly constructed of light-weight material and actuated by compressed air capable of obtaining high speed, rapid movement with a high degree of positional accuracy.

According to the present invention, the actuator assembly comprises an output member, a first-actuated motor connected to the output member for effecting reciprocal horizontal movement of the output member along a horizontal axis, a second fluid-actuated motor for effecting angular oscillatory movement of the output member about a vertical axis, a third fluid-actuated motor for effecting vertical reciprocal movement of the output member along a vertical axis perpendicular to the horizontal axis, and means for directing motive fluid to and from the various motors to accordingly actuate same and effect rapid movement of the output member to a predetermined position with a high degree of precision and accuracy.

Other features and advantages of the actuator assembly constructed in accordance with the principles of the present invention will be better understood upon a reading of the following specification and appended claims when taken in conjunction with the following drawings in which:

Figure 1:
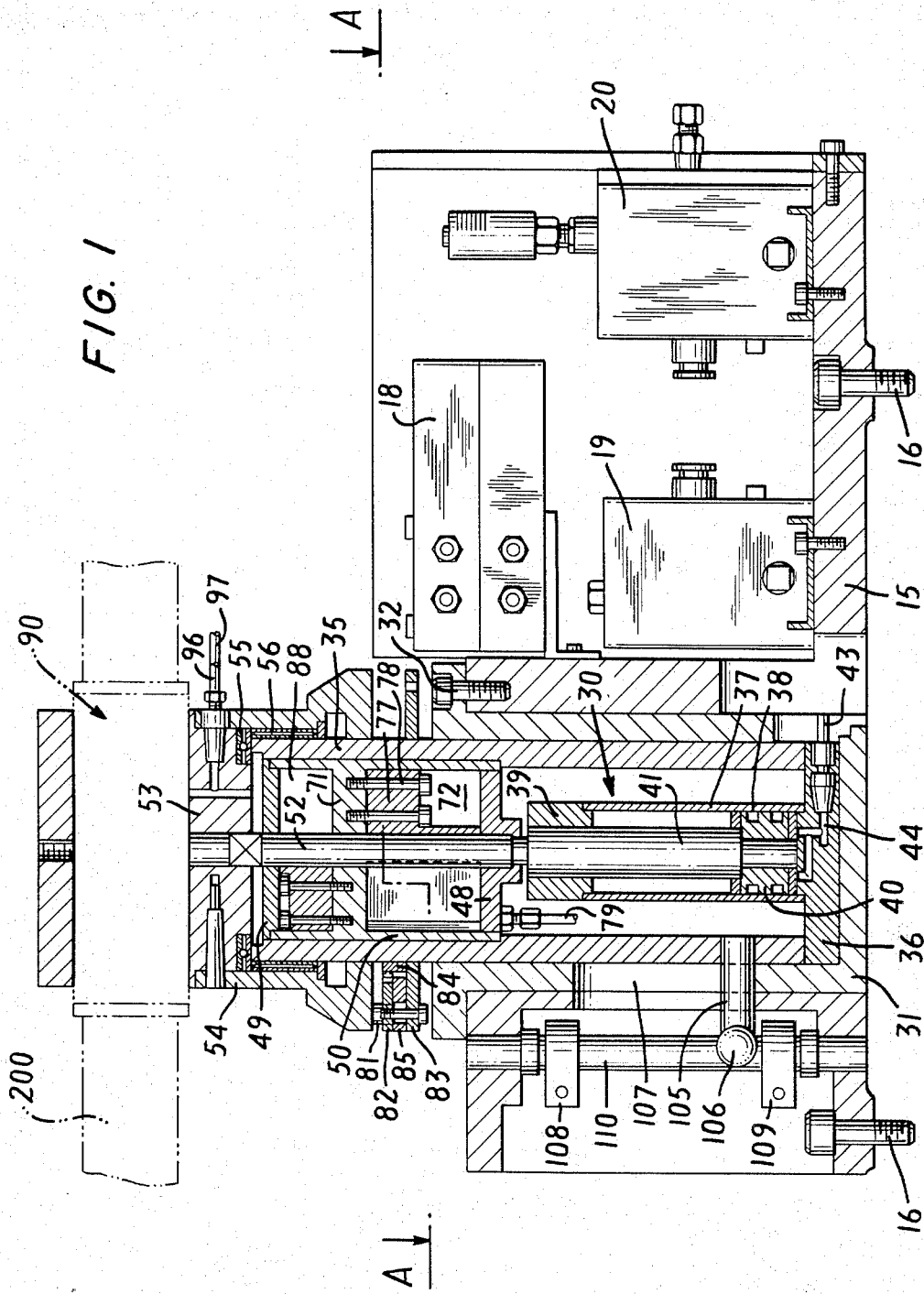
FIG. 1 is a vertical cross-sectional view of an actuator assembly constructed in accordance with the principles of the present invention.

The actuator assembly of the present invention comprises an output member 200, fluid-actuated means 30 for effecting vertical reciprocal movement of the output member along a vertical axis, fluid-actuated means 70 for pivoting the output member about a pivot axis, and fluid-actuated means 90 for effecting reciprocal movement of the output member along a horizontal axis perpendicular to the vertical axis of the fluid-actuated means 30. The output member 200 comprises a transfer arm of an industrial robot (not shown) and is connected at one end to a manipulator device 10 whereupon the actuator assembly may effect vertical, pivotal and horizontal movement of the manipulator device.

The actuator assembly is mounted on a frame 15 and a series of screws 16 are provided for attaching the frame to a work table, not shown. Also mounted on the frame 15 are electromagnetic valve assemblies 18, 19 and 20 for controlling the supplying and exhausting of motive fluid to the actuator assembly. Each valve assembly comprises a set of solenoid valves operative in response to electrical control signals applied thereto for controlling the supplying and exhausting of motive fluid to respective ones of the fluid-actuated means 30, 70 and 90.

The first actuating means 30 comprises a guide cylinder 31 fixedly attached to the frame by screws 32. The screws 32 are threaded into tapped bores in the frame and the screws extend through openings provided in a flange connected to the upper end of the guide cylinder 31.

A lift cylinder 35 is mounted for vertical reciprocal movement in the guide cylinder 31. The lift cylinder 35 is shown in FIG. 1 in its fully retracted position and in this position, the lift cylinder abuts against a stationary support member 36 disposed within the interior base portion of the lift cylinder 35. A reciprocatory fluid motor 37 is mounted within the lift cylinder 35 and the reciprocatory motor is coaxially aligned with the longitudinal axis of the lift cylinder.

The reciprocatory motor 37 comprises a hollow working cylinder 38 secured to an upstanding circular projection of the support member 36 and the rod end of the cylinder is closed by an annular head 39. A piston 40 is reciprocally mounted within the cylinder 38 and has a piston rod 41 connected thereto and the piston rod slidably extends through the annular head 39. The piston rod 41 is connected to the output member 200 through a shaft 52 and a sweep member 53 whereupon vertical reciprocal movement of the piston 40 effects vertical reciprocal movement of the output member.

In the base of the support member 36 is provided a series of fluid conduits for supplying an exhausting motive fluid into the working cylinder 38 to accordingly actuate the piston 40. A conduit 43 is connected at one end to a bore 44 in the support member 36 and the bore branches out into a pair of bores opening into the working cylinder 38. The other end of the conduit 43 is connected to the electromagnetic valve assembly 19 thorugh a conduit (not shown).

The electromagnetic valve assembly 19 is operable in response to electrical control signals applied thereto to selectively supply an exhaust motive fluid to the reciprocatory motor 37 to accordingly effect extension and retraction of the piston rod 41 relative to the cylinder 38. When motive fluid is supplied through the conduit 43 into the working cylinder 38, the motive fluid acts upon the working face of the piston 40 and effects extension of the piston rod 41 and when the motive fluid is exhausted from the working cylinder, the piston rod is retracted into the cylinder 38 due to its own weight and the weight of the load connected to the piston rod 41. As well as the weight of the piston.

A bearing plate 48 is disposed within the lift cylinder 35 atop the working cylinder 38 and another bearing plate 49 is disposed within the lift cylinder in longitudinally spaced relationship from the bearing plate 48. A cylindrical supporting member 50 is secured to the interior of the lift cylinder 35 and the bearing plate 48 is connected to the lower end of the cylindrical supporting member 50 and the bearing plate 49 is connected to the upper end of the cylindrical supporting member. Each of the bering members 48, 49 comprise for rotatably mounting the shaft 52.

The shaft 52 rotatably rests on the end trip of the piston rod 41 and is maintained in this position by the force of gravity. The upper end of the shaft 52 is connected to the sweep member 53 such that angular movement of the shaft 52 effects a corresponding angular movement of the sweep member 53. A cylindrical supporting sleeve 54 is rigidly connected to the sweep member 53 for movement therewith. A set of ball bearings 55 rotatably mount the sweep member 53 to the upper end of the lift cylinder 35 and a set of roller bearings 56 rotatably mount the supporting sleeve member 54 on the fixed cylinder 35.

Figure 2:
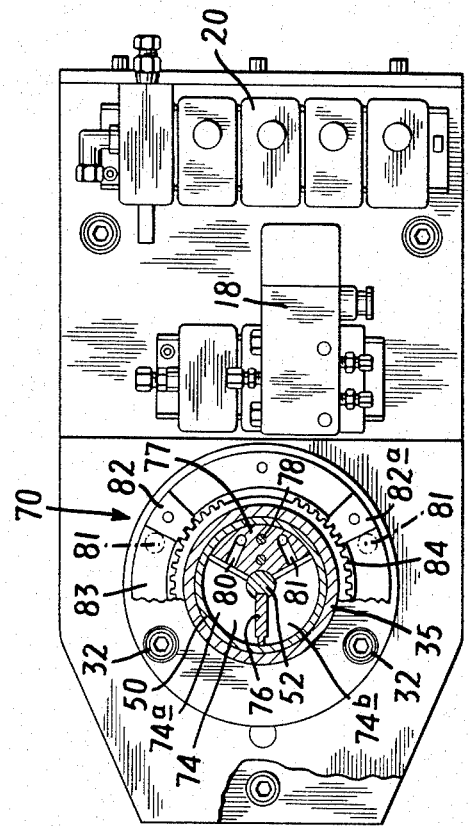
FIG. 2 is a cross-sectional view taken along the line A—A in FIG. 1 of the means for effecting angular oscillatory movement of the output member.

The fluid-actuating means 70 comprises an oscillatory motor 72 contained within the supporting member 50 for effecting angular oscillatory movement of the shaft 52. The oscillatory motor 72 comprises a fluid-actuated vane type motor and as seen in FIG. 2, comprises an arcuate working chamber 74 divided into subchambers 74a and 74b by a vane 76 radially extending outwardly from the shaft 52. The upper surface of the chamber 74 is closed by a circular plane 74 connected to the cylindrical supporting member 50 and the lower portion of the arcuate chamber 74 is closed by the bearing plate 48.

An arc-shaped solid member 77 is positioned within the interior of the supporting member 50 and cooperates therewith to define the arcuate working chamber 74. A pair of threaded bolts 78 secure the arc-shaped member 77 to the circuit partition plate 71. A pair of supply-and-exhaust conduits 80, 81 open respectively into the subchambers 74a and 74b. These conduits communicate with a pair of flexible conduits 79 (only one of which is visible in FIG. 1) and the flexible conduits 79 are connected to the electromagnetic valve assembly 20.

During operation, the oscillatory motor 72 is pivotally displaced in a clockwise direction (as viewed in FIGS. 2) by supplying motive fluid through the conduit 81 into the subchamber 74b while simultaneously opening the conduit 80 to exhaust. This is accomplished by electrically energizing the electromagnetic valve assembly 20 to actuate the appropriate solenoid valve to direct motive fluid through the conduit 80 into the subchamber 74b whereupon this motive fluid acts upon the vane 76 to angularly displace same in a clockwise direction while actuating the appropriate solenoid valve to open the subchamber 74a to exhaust. In order to reverse the direction of pivotal movement of the oscillatory motor 72, the electromagnetic valve assembly 20 is selectively energized to effect supplying of motive fluid to the conduit 80 while opening the conduit 81 to exhaust, thus motive fluid flows into the subchamber 74a and acts against one working face of the vane 76 to effect counterclockwise angular displacement of the shaft 52.

Limiting means are provided for limiting the angular movement of the oscillatory motor 72. The limiting means comprises a pair of projections 81 depending from an annular skirt portion of the cylindrical supporting sleeve 54 and a pair of stop members 82, 82a releasably connected to the lift cylinder 35. The projections 81, the cylindrical supporting sleeve 54, the sweep member 53 and the shaft 52 moves as an integral unit and the extent of angular displacement of each oscillatory motor is determined by the position in which the projection 81 abuts or strikes against its associated stop member 82, 82a.

Figure 3:
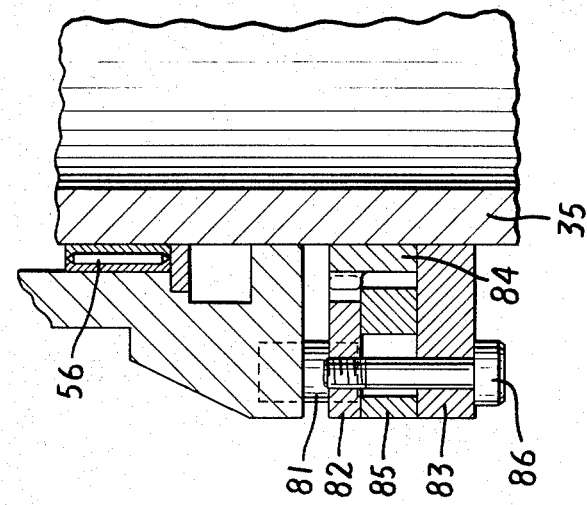
FIG. 3 is an enlarged cross-sectional side view of a portion of the oscillatory means shown in FIGS. 1 and 2.

The stop member 82 is releasably connected to the left cylinder 35 so that the stop member may be selectively positioned in any desired position around the circumference of the lift cylinder. As seen in FIG. 3, an annular flange 83 is secured around the periphery of the lift cylinder 35 and a ring 84 having external teeth around the periphery thereof is connected to the flange 83. The stop member 82 is provided with several teeth configured to mesh with the teeth on the periphery of the ring 84.

A spacer ring 85 is positioned between the flange 83 and the stop members 82, 82a to properly align each teeth on the stop member with the teeth on the ring member 84 and a screw 86 extends through both the flange 83 and each spacer 85 is threaded into the stop member to releasably position same in engagement with the ring member 84 in any desired angular position around the circumference of the lift cylinder 35. The spacer 85 also functions to space the stop members 82, 82a in proper elevation with respect to the projection 81 thereby enabling the projection 81 to abut or strike against the stop members.

In order to adjust the limit position of the oscillatory motor 72 in one direction, the screw 86, the stop member 82 and the spacer 85 are removed from the flange 83 and the stop member 82 is then placed into its desired angular position around the lift cylinder 35 and moved into engagement with the teeth on the ring ear 84. The spacer 85 is placed between the stop member 82 and the flange 83 after which the screw 86 is inserted through one of the numerous holes provided in the flange 83 and threaded into the stop member 82 to releasably connect same in position. The meshing engagement of the teeth combined with the holding action of the screw 86 effectively maintains the stop member 82 in a stationary position and enables the stop member 82 to absorb the striking impact of the projection 81 without any detrimental effect. As seen in FIG. 2, the other stop member 82a limits the extent of angular movement of the oscillatory motor during movement thereof in the other direction.

A buffer device 88 is disposed interiorly of the lift cylinder 35 above the circular partition plate 71. The buffer device comprises a chamber filled with a viscous medium, such as oil, and a movable member disposed within the chamber and connected to the shaft 52 effective to cushion the impact of the projection 81 striking against the stop member 82. The buffer device functions to reduce shock imparted to the lift cylinder and also balances the angular movement of the shaft 52.

Figure 4:
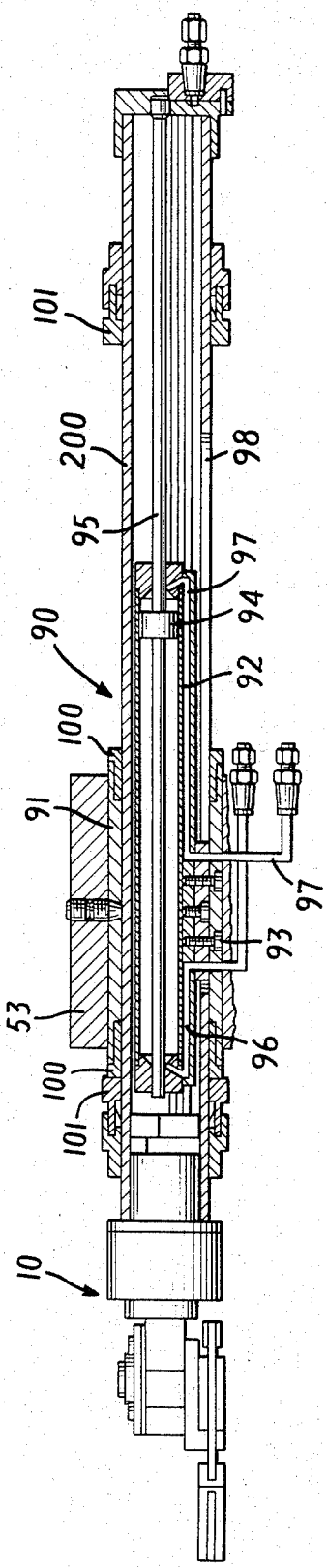
FIG. 4 is a vertical cross-sectional view of the means for effecting horizontal reciprocal movement of the output member.

The fluid-actuated means 90 is seen in FIG. 4 and is connected to the sweep member 53 to undergo angular oscillatory movement concurrently therewith. A cylindrical support 91 is rigidly connected to the sweep member 53 by means of screws and by this connection, any angular movement of the sweep member 53 is transmitted to the cylindrical support 91. The fluid-actuated means 90 comprises a reciprocatory motor having a cylinder 92 rigidly secured to the cylindrical support member 91 by a series of screws 93. A working member comprising a piston 94 is reciprocably mounted within the cylinder 92 and the piston has a piston rod 95 extending axially from either working face of the piston.

One end of the piston rod 95 slidably extends through one end wall of the cylinder and the other end of the piston rod slidably extends through the other end of the cylinder. The output member 200 is connected to one end of the piston rod 95 and the output member comprises a hollow transfer arm constituting an arm of the industrial robot (not shown). A manipulator device 10 is connected to the other end of the transfer arm 200 and the actuator assembly of the present invention is used to actuate the transfer arm 200 to accordingly effect movement of the manipulator device 10 in accordance with a predetermined program fed into the industrial robot. A plurality of fluid conduits extend longitudinally through the interior of the transfer arm 200 for supplying and exhausting motive fluid to actuate the manipulator device 10. Since the transfer arm 200 is connected to the piston rod 95, reciprocal movement of the working member 94 effects a similar reciprocal movement of the transfer arm 200.

The fluid circuit for actuating the reciprocatory motor 90 comprises a supply-and-exhaust-conduit 96 opening into one end of the cylinder 92 and another supply-and-exhaust conduit 97 opening into the other end of the cylinder 92. The conduits 96 and 97 are connected through suitable connections (not shown) to the electromagnetic valve assembly 18 which functions to control the supply and exhaust of motive fluid to the reciprocatory motor in response to control signals applied to the individual solenoid valves. In order to enable sliding movement of the transfer arm relative to the sweep member 53, a slot 98 is provided in the base of the transfer arm to accommodate therethrough the connecting portion of the cylinder 92 to the sweep member 53.

Limiting means are provided for limiting the extent of extention and retraction of reciprocatory motor 90. The limiting means comprises an annular stop member 100 connected to each end of the cylindrical support member 91 and a pair of strike members 101 adjustably connected to the transfer arm 200. During reciprocal movement of the reciprocatory motor, the strike members 100 alternately strike and abut against one of the stop members 100 and coact therewith to limit the extent of reciprocal movement of the motor. The strike membess 101 are releasably mounted around the transfer arm 200 and may be selectively positioned along the transfer arm to thereby control the extension and retraction of the manipulator device 10.

A pair of limit switches, not shown, are disposed along the path of travel of the transfer arm and are actuated by the respective strike members 101 during movement of its transfer arm. The limit switches are connected to the solenoid valves in the electromagnetic valve assembly 18 and provide an electrical signal to actuate the appropriate solenoid valve to terminate to the supply of motive fluid to the reciprocatory motor whereupon the motor is maintained in its extended or retracted position until the solenoid valves are again actuated.

A similar set of limit switches (not shown) are provided along the path of movement of the oscillatory motor 72 and the reciprocatory motor 37. The limit switches associated with the oscillatory motor are disposed along the path of travel of the projection 81 and are actuated by the projections 81 to accordingly transmit an electrical signal to the electromagnetic valve assembly 19 to terminate the supplying of motive fluid to the oscillatory motor.

Turning again to FIG. 1, an arm 105 is connected to the lift cylinder 35 and projects radially outwardly therefrom and terminates at its distal end in a striking element 106. The frame 15 and the guide by cylinder 31 are provided with a longitudinally extending slot 107 accommodating therein the arm 105 and the slot coacts with the arm 105 guide the reciprocal movement of the lift cylinder 35 along a vertical axis. A pair of end stop members 108, 109 are releasably attached to a vertically extending rod 110 and the end stop members coact with the striking element 106 to limit the extent of vertical movement of the reciprocatory motor 30.

A pair of limit switches (not shown) are disposed along the path of travel of the strike element 106 and are actuated by the strike element before same strikes against one of the stop members 108, 109 whereupon the limit switches transmit an electrical signal to the electromagnetic valve assembly 20 to terminate the supplying of motive fluid to the reciprocatory motor whereupon the working member 40 is maintained in position by the motive fluid already present in the working cylinder 38. None of the limit switches have been shown in the drawings and each of the limit switches are well known in construction and develop an electrical output signal in response to mechanical actuation of the switch.

The actuator assembly of the present invention is operable to effect three-dimensional movement of the output member 200 and each of the fluid-actuating means 30, 70 and 90 are operative independently of the actuation of the others thereby providing the actuator assembly with a broad versatility of controlled movements. Thus, the actuator assembly constructed in accordance with the principles of the present invention is ideally suited for use in industrial robots and the various movements of the actuator assembly may be controlled in accordance with a predetermined program fed into the robot.

The actuator assembly of the present invention is comparatively small in size, constructed of light-weight materials and is preferably designed to be used with compressed air as the motive fluid. These features render the actuator assembly easily transportable and highly suitable for use in industrial robots employed in the precision machinery industry where vertical movement, sweeping pivotal movement and horizontal movement are all needed to effect numerous mechanical operations. Moreover, the actuator assembly constructed in accordance with the present invention is controlled by a series of electrically-operated solenoid valves which may be controlled in accordance with a predetermined program contained on a punched card or the like, depending upon the desired sequence of mechanical movements to be performed.

Many obvious modifications of the afore-described embodiment will become apparent to those skilled in the art and the present invention includes all such modifications falling within the scope and spirit of the invention as described in the appended claims.

We claim:

1. An actuator assembly comprising: an output member; first fluid-actuated means connected to said output member responsive to motive fluid supplied thereto and exhausted therefrom for effecting reciprocal movement of said output member along a first axis, said first fluid-actuated means comprising a reciprocatory motor connected to said output member and comprising a cylinder, a piston reciprocally mounted within said cylinder, and a piston rod interconnecting said piston and output member; second fluid-actuated means responsive to motive fluid supplied thereto and exhausted therefrom for effecting angular oscillatory movement of said output member about a second axis, said second fluid-actuated means comprising an oscillatory motor comprising means defining an arcuate working chamber, a working member movably disposed within said working chamber and dividing same into two subchambers, a shaft mounted for angular oscillatory movement and having said working member connected thereto, and means connecting said cylinder of said reciprocatory motor to said shaft to undergo angular movement therewith; third fluid-actuated means responsive to motive fluid supplied thereto and exhausted therefrom for effecting reciprocal movement of said output member along a third axis, said third fluid-actuated means comprising another reciprocatory motor comprising another cylinder, another piston reciprocably mounted within said another cylinder, and another piston rod connected to said another piston; means mounting said another recirocating motor in a vertical position whereby said another piston rod is mounted to undergo vertical reciprocal movement means interconnecting said another piston rod and said shaft in abutting relationship for transmitting reciprocal movement of said another piston rod to said shaft while preventing angular movement of said shaft from being transmitted to said another piston rod; and fluid circuit means connectable to a source of motive fluid for selectively supplying and exhausting motive fluid to and from said first, second and third fluid-actuated means to accordingly actuate same and effect movement of said output member.

2. An assembly according to claim 1; wherein said first fluid-actuated means includes means for effecting horizontal reciprocal movement of said output member along a horizontal axis; and wherein said second fluid-actuated means includes means for effecting angular oscillatory movement of said output member in a horizontal plane containing therein.

3. An assembly according to claim 1; wherein said fluid circuit means includes means for supplying and exhausting motive fluid to and from each said fluid-actuated means independently of the supplying and exhausting of motive fluid to and from the other.

4. An assembly according to claim 1; wherein said third fluid-actuated means includes a hollow guide cylinder, a hollow open-ended lift cylinder mounted for vertical reciprocal movement within said guide cylinder, means mounting said oscillatory motor within said lift cylinder for vertical reciprocal movement therewith, and means mounting said another reciprocatory motor within said lift cylinder in longitudinally spaced-apart relationship from said oscillatory motor.

5. An assembly according to claim 1; wherein said fluid circuit means comprises means defining a series of supply-and-exhaust conduits for supplying and exhausting motive fluid to and from each of said motors, and an electrically-operated valve position in each of said supply-and-exhaust conduits operative in response to electrical signals applied thereto to control the supplying and exhausting of motive fluid to said motors.

6. An assembly according to claim 1; including adjustable limiting means for adjustably limiting the extent of angular movement of said output member.

7. An assembly according to claim 6; wherein said adjustable limiting means comprises at least one projection, means connecting said projection to undergo angular movement concurrently with the angular movement of said shaft, a stop member, and means for adjustably mounting said stop member in the path of movement of said projection and in any one of a plurality of angularly spaced-apart limiting positions, whereby said projection abuts against and is stopped by said stop member during angular movement of said projection.

* * * * *